United States Patent [19]
Betters et al.

[11] Patent Number: 5,762,855
[45] Date of Patent: Jun. 9, 1998

[54] METHOD OF USING A SEQUENTIAL FILL VALVE GATED INJECTION MOLDING SYSTEM

[75] Inventors: James E. Betters, Newburgh, Ind.; Michael Smith, Belleville, Ill.

[73] Assignee: Nascote Industries, Nashville, Ill.

[21] Appl. No.: 639,743

[22] Filed: Apr. 29, 1996

[51] Int. Cl.[6] .................................................. B29C 45/18
[52] U.S. Cl. .................... 264/328.8; 264/328.13; 425/145; 425/564; 425/566; 425/573
[58] Field of Search .................................. 425/573, 562, 425/564, 566, 145; 264/328.8, 328.13

[56] References Cited

U.S. PATENT DOCUMENTS

| | | | |
|---|---|---|---|
| 3,671,159 | 6/1972 | Greenberg et al. | 425/573 |
| 4,867,938 | 9/1989 | Schad et al. | |
| 5,030,406 | 7/1991 | Sorensen. | |
| 5,032,078 | 7/1991 | Benenati. | |
| 5,073,328 | 12/1991 | Schad et al. | |
| 5,098,637 | 3/1992 | Hendry. | |
| 5,135,703 | 8/1992 | Hunerberg et al. | |
| 5,223,275 | 6/1993 | Gellert. | |
| 5,389,315 | 2/1995 | Yabushita. | |
| 5,556,582 | 9/1996 | Kazmer | 425/573 |

OTHER PUBLICATIONS

Kona Corporation Promotional Material; "A Sequential Valve Gate Success," *Konanews*, pp. 2-3, vol. 7, No. 2, Jun. 1995.

Joseph Orgando, "Sequential Valve Gating Aids Filling of Large Parts," *Plastics Technology*, pp. 17, 19 and 21, May 1995.

James Betters and John Duffy, "The Benefits of Sequential Fill Valve Gate Hot Runner Systems for Molding Automotive Bumper Fascias, " *Society of Plastics Engineers*, Detroit Section and Automotive Division RETEC, pp. 173-181, Nov. 8 and 9, 1995.

*Primary Examiner*—Tim Heitbrink
*Attorney, Agent, or Firm*—Banner & Witcoff, Ltd.

[57] ABSTRACT

A system for injection molding of large components is disclosed that provides for the production of higher quality large molded components with a reduction in both molding cycle time and molding costs. Plasticized material communicates with a mold, having at least one single cavity, through a manifold that has at least two spaced valve gates that are independently opened and closed as directed by a controller to selectively communicate plasticized material to the mold cavity at separate locations in the mold cavity. The controller directs the valve gates to sequentially open and close during the filling phase so as to achieve the desired melt front advancement within the mold cavity. Once the mold cavity has been filled as desired, the valve gates are closed to effectively seal the manifold from the mold cavity. The plasticized material within the manifold is held in compression while the mold cavity is open, so as to prevent appreciable expansion of the material that has been found to result in molded part imperfections. Additional material may be plasticized and held in compression while the mold cavity is open, resulting in a further reduction in overall cycle time.

10 Claims, 8 Drawing Sheets

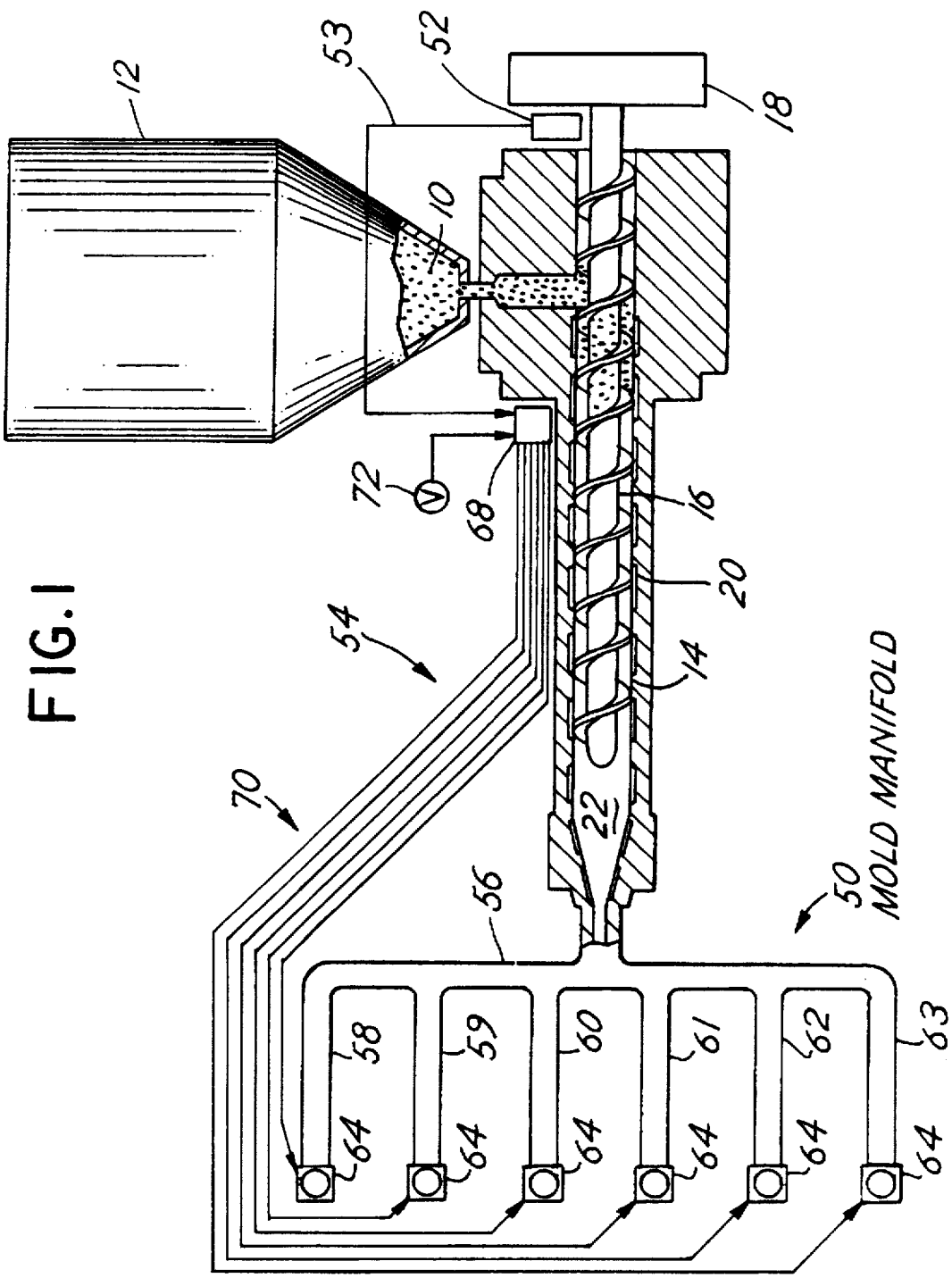
FIG. I

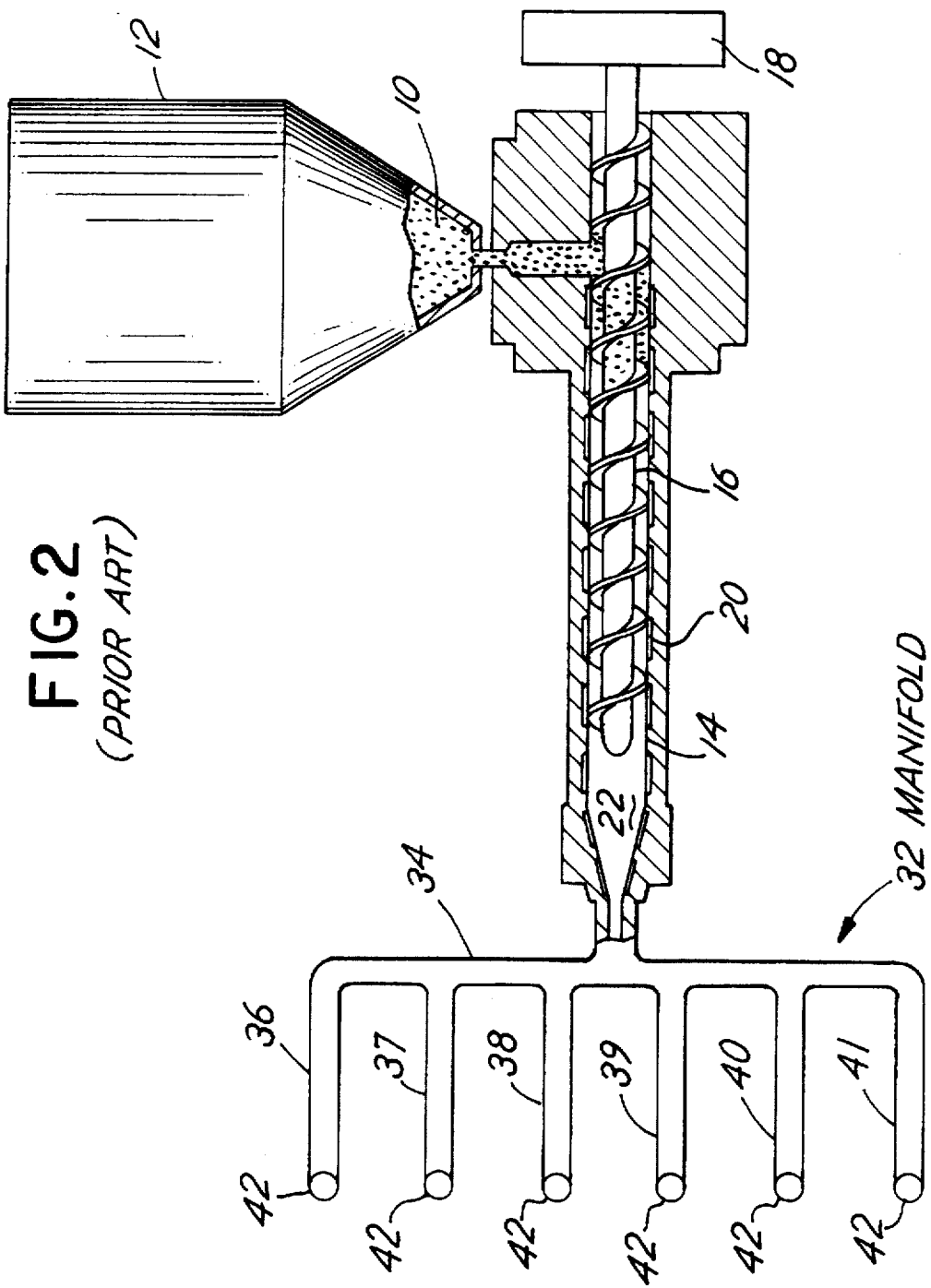

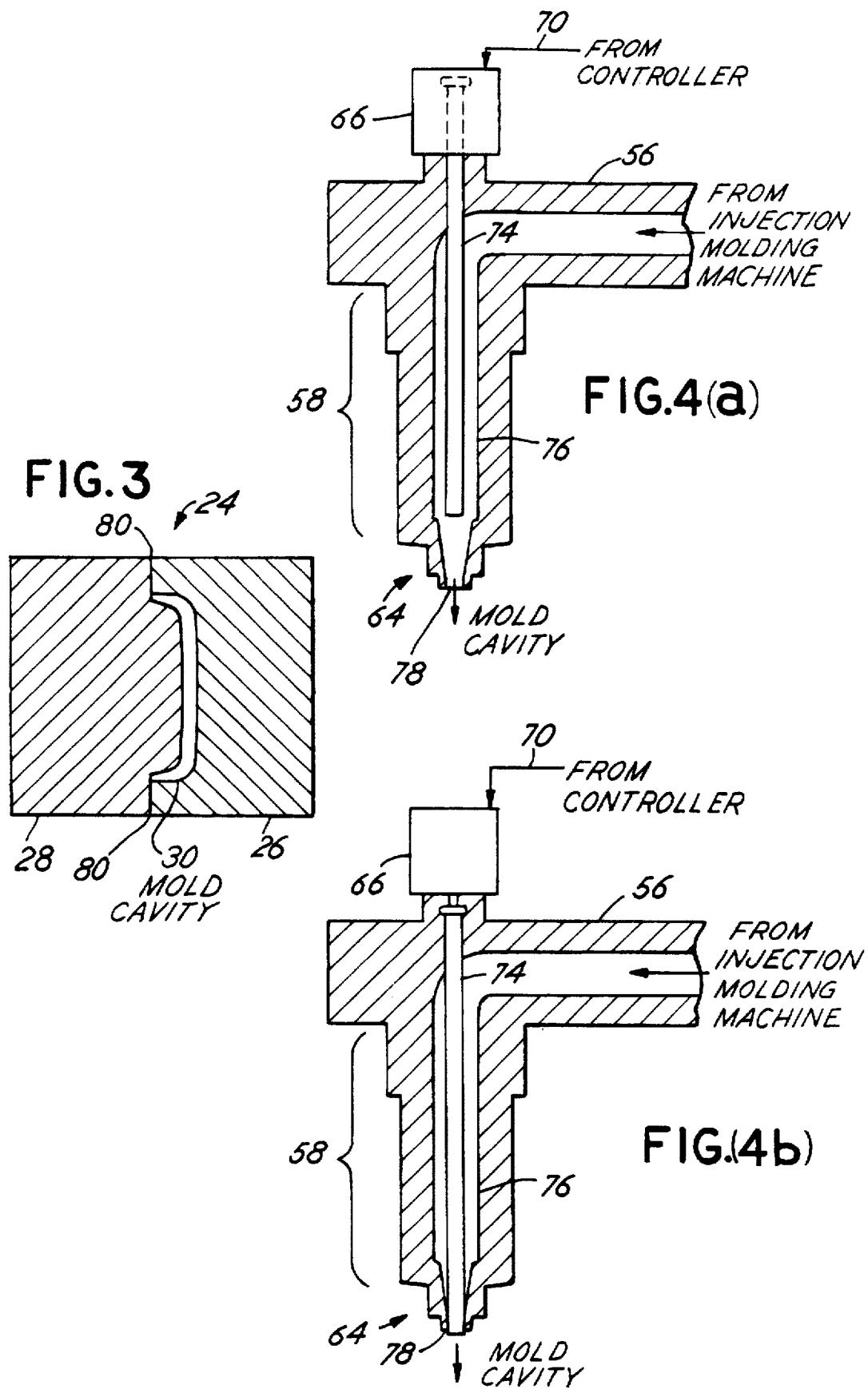

METHOD OF USING A SEQUENTIAL FILL VALVE GATED INJECTION MOLDING SYSTEM

BACKGROUND OF THE INVENTION

The present invention relates to injection molding methods and apparatus, and, more particularly, a sequential fill valve gated injection molding system for producing large molded components.

Large molded parts such as automotive bumper fascias, for example, have become very complex over the past several years. Indeed, design engineers are integrating many features into the bumper such as grilles and light openings to reduce tooling and manufacturing costs. Also, to save material, bumpers are designed with thinner walls. Due to the complex cavity geometries and increased flow length versus wall thickness ratios, it is often difficult to predict the actual flow pattern that will take place during mold filling.

Although design software may be used to help determine the most optimum processing conditions, gate locations, and hot runner diameters for a balanced fill, quite often the expected fill pattern is not realized in practice as a result of variables such as steel dimension variations, mold temperature variations, and venting inadequacies, for example. Process engineers are therefore faced with a nonuniform fill which under certain conditions may result in decreased dimensional stability of the bumper, as well as deficiencies in paint adhesion characteristics and/or other surface appearance concerns.

Improved processing techniques that provide more control over the filling of large complex cavity geometries are required to meet the increased demands presented by more modern molding standards. To improve part quality, melt front advancement must be further controlled during the actual filling phase to achieve a more uniform filling and packing distribution. Moreover, there is a continuing interest in pursuing further time and cost efficiencies associated with part manufacture.

It is therefore an object of the present invention to provide an injection molding system for large molded components that may be used to enhance the quality of the final molded part in a timely and cost-efficient manner. Other objects and advantages of the present invention will be apparent to those of ordinary skill in the art from the following description.

SUMMARY OF THE INVENTION

The sequential fill valve gated injection molding system of the present invention provides an inventive method for molding large components in a mold having at least one mold cavity. Plasticized material is introduced into a single cavity mold through a manifold. The manifold has at least two spaced valve gates that are independently opened and closed as directed by a controller to selectively communicate plasticized material from the manifold to the mold cavity at separate locations in the mold cavity. The controller directs the valve gates to sequentially open and close during the filling phase so as to achieve the desired melt front advancement within the mold cavity. Once the mold cavity has been filled, the valve gates are closed to effectively seal the manifold from the mold cavity. The closed valve gates thereby assist in allowing the plasticized material within the manifold to be held in compression while the mold cavity is open for removal of the molded component from the mold cavity, so as to prevent appreciable expansion of the material that has been found to result in imperfections, such as splay, in molded products.

If desired, additional material may be plasticized while the mold cavity is open for removal of the molded component from the mold cavity. This additional plasticized material may be held for anticipated use in a subsequent molding cycle, to thereby reduce the overall molding cycle time. Further, the additional plasticized material may be held in compression to prevent appreciable expansion of the material.

While valve pin gated manifold designs are not entirely new to injection molding, the molding of large parts has not been previously realized in the same manner as the sequential valve gating injection molding system of the present invention. Indeed, use of the present invention has demonstrated a variety of advantages in molding large parts, including for example a reduction in molding cycle time and manufacturing costs, increased molding capacity, reduction of part imperfections such as splay, enhanced paint adhesion characteristics, as well as improved knit line appearance and dimensional stability.

BRIEF DESCRIPTION OF THE DRAWING

A preferred embodiment of the present invention is described herein with reference to the drawing wherein:

FIG. 1 is a schematic representation of a valve-gated injection molding system in accordance with one embodiment of the present invention;

FIG. 2 is a schematic representation of a prior art injection molding machine communicating with a main bore from which multiple thermally-gated drops depend to introduce plasticized material to a mold cavity;

FIG. 3 is a cross-sectional side view of an example mold where a core portion and a cavity portion mate to form a mold cavity, the core and cavity portions in turn being connected to a clamp platen (not shown);

FIG. 4(a) is a cross-sectional side view of a preferred valve gated nozzle of the type used in accordance with one embodiment of the present invention, with the valve pin in the open position;

FIG. 4(b) is a cross-sectional side view of a preferred valve gated nozzle of the type used in accordance with one embodiment of the present invention, with the valve pin in the closed position;

DESCRIPTION OF THE PREFERRED EMBODIMENT

Figure 5:
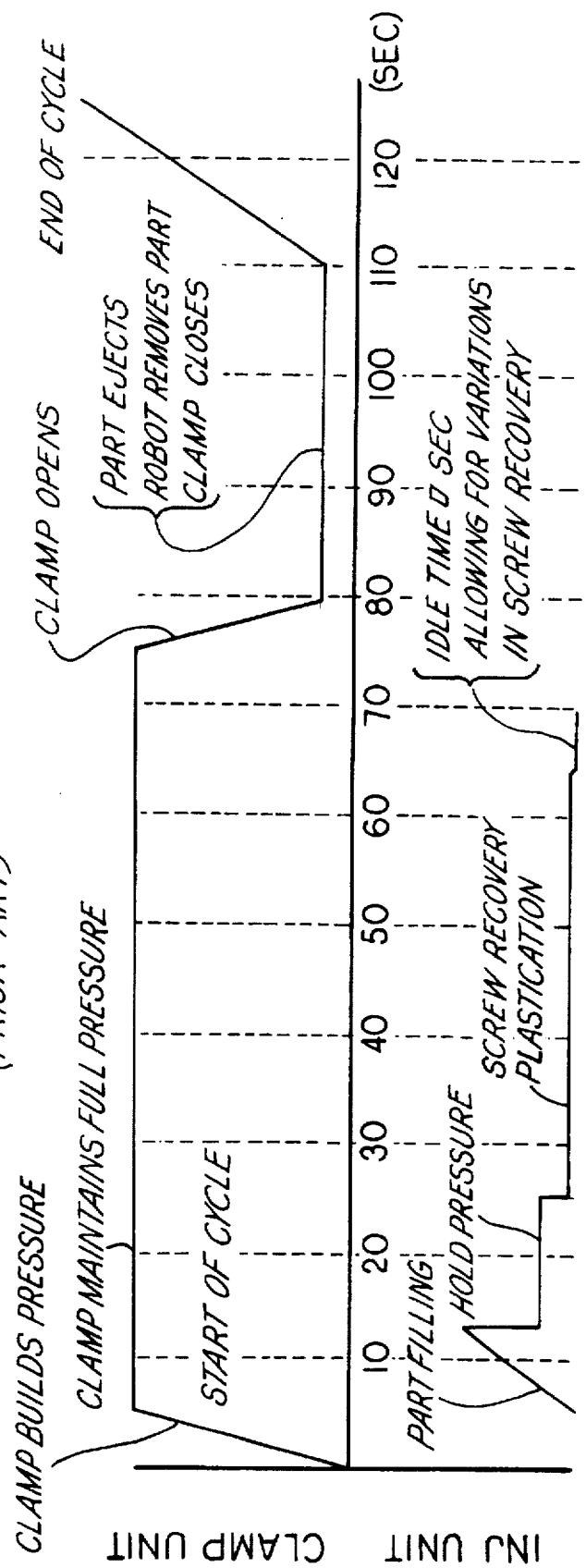
FIG. 5 is a timing diagram to illustrate the molding cycle time of an example application of a prior art injection molding system.

The preferred embodiment of the present invention is shown for example in FIGS. 1 and 4–8. The preferred sequential fill valve gated injection molding system has been realized using a 3500-ton Klockner Windsor press. The press is used in the preferred embodiment to produce automobile facias, such as bumper components for example. It will be understood, however, that other types of large parts, such as those that typically weigh 5 or more pounds for example, may similarly be manufactured through the use of the present invention.

FIGS. 1 and 2 each illustrate an injection molding apparatus whereby plastic pellets 10 are fed from a hopper 12 into a cylindrical channel 14, where the pellets 10 are transported along the length of the channel 14 through the use of a reciprocating screw 16. Axial rotation of the screw 16 is achieved through a hydraulic motor 18. As the pellets 10 traverse the channel 14, they become heated by heater bands 20 and, as a result, the pellets 10 melt and coalesce to form a melt pool 22. The melt pool 22 that resides upstream from the screw 16 constitutes the shot of plasticized material in que to be next injected through the mold manifold and into the mold cavity.

As shown for example in FIG. 3, a typical mold 24 consists of a cavity portion 26 and a core portion 28. The cavity portion 26 and core portion 28 mate with one another to form a mold cavity 30, and are held with substantial mold press forces to form an injection molded part when the mold cavity 30 is filled. The movable section of the mold, whether the cavity portion 26 or core portion 28 for example, can be opened and closed upon the stationary section to allow molded parts to be withdrawn from the mold 24.

FIG. 5 is a diagram to illustrate a typical 100–110 second cycle used before the present invention to form an automobile facia component. With reference now to FIGS. 2 and 5, the cycle begins with the mold clamp building pressure to a full pressure that is maintained during the molding of the part. Pressure on the melt pool 22 exerted by the screw 16 creates an injection pressure that is used to fill the mold cavity 30 with the melt pool 22 in que in the manifold 32. The first stage injection pressure exerted on the melt pool 22 by the screw 16 causes the melt pool 22 to advance through the main bore 34 of the manifold 32.

Six heated drops 36–41 depend from the main bore 34 at spaced intervals to simultaneously introduce the melt pool 22 into the molding cavity 30 at six separate locations. Although the mold cavity 30 is filled through simultaneous advancement of the melt 22 through the six drops 36–41, balancing of the fill may be sought by varying the diameters of the interior central channels of the respective drops 36–41.

Once the part has been substantially filled (e.g. 95% filled) during this first stage pressure, the injection pressure is lowered to a hold pressure whereby the mold 30 continues to fill simultaneously through all six drops 36–41 at a reduced injection pressure. Full pressure is maintained on the clamp to keep flash to a minimum.

Once the mold has been completely filled, additional material is plasticized upstream of the thermal gates 42 during a screw recovery stage to form the next shot of plasticized material in que for the next part cycle. Once screw recovery is complete, each of the thermal gates 42 on the depending drops 36–41 draws heat away from adjacent mold steel so as to harden plasticized material at the tips of all six drops 36–41. This hardening of plasticized material at the tips of the drops 36–41 in turn seals the manifold 32 such that melt 22 is retained within the manifold 32 in anticipation of the next part cycle.

The molding cycle then reaches a decompression stage whereby the injection pressure imposed on the melt 22 is relieved substantially or even altogether through retraction of the screw 16. Decompression of the melt 22 in this way helps ensure that the thermal seals formed at the thermal gate locations 42 on the manifold 32 remain effective when the clamp is opened and the molded part is removed. It has been found, however, that decompression of the melt 22 at this stage allows gasses or other volatiles to expand in the melt 22 upstream of the thermal gates 42, which in turn often results in imperfections in subsequently-molded parts. Such imperfections may appear on the molded product as surface splay or silver streaking, for example.

Once the manifold 32 has been thermally sealed at the various gate locations 42 and the melt 22 has been decompressed, the clamp is opened and the molded part is removed.

The clamp then closes in anticipation of the next part cycle.

The total time for the molding cycle described above is approximately 100–110 seconds or more for an example molded automobile bumper part.

Figure 6:
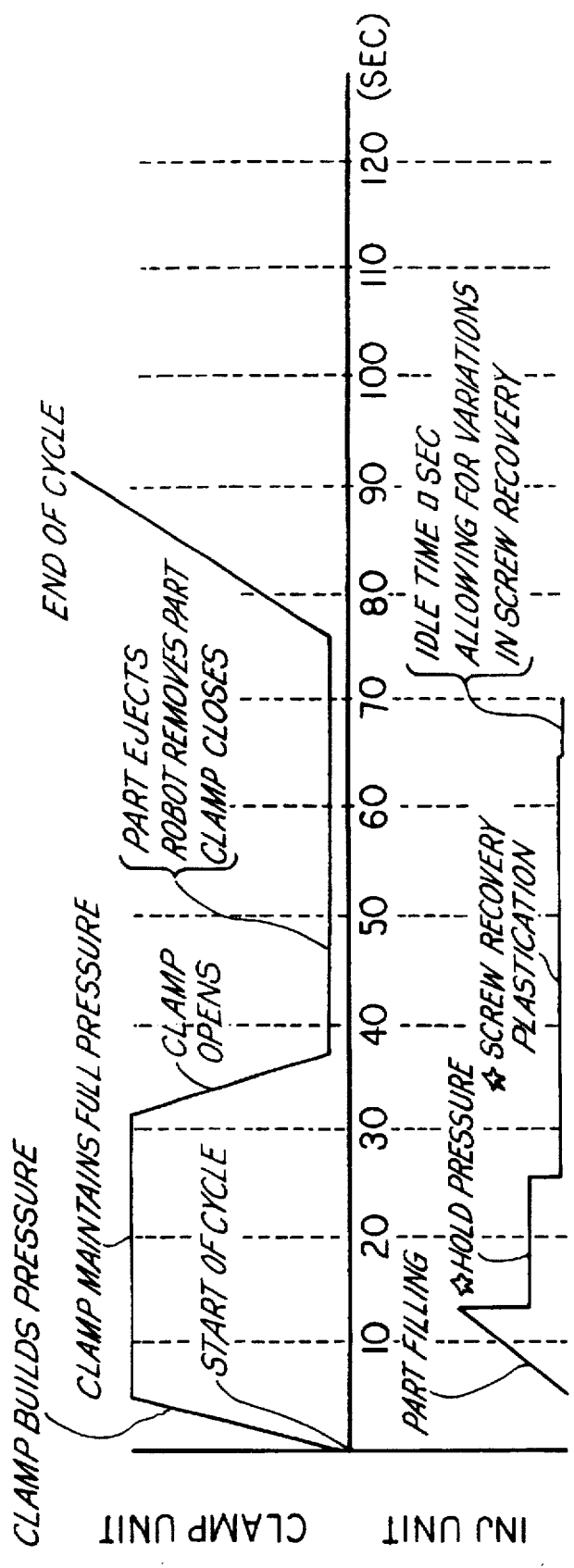
FIG. 6 is a timing diagram to illustrate the reduced molding cycle time realized in an example application of the present invention.
Figure 7A:
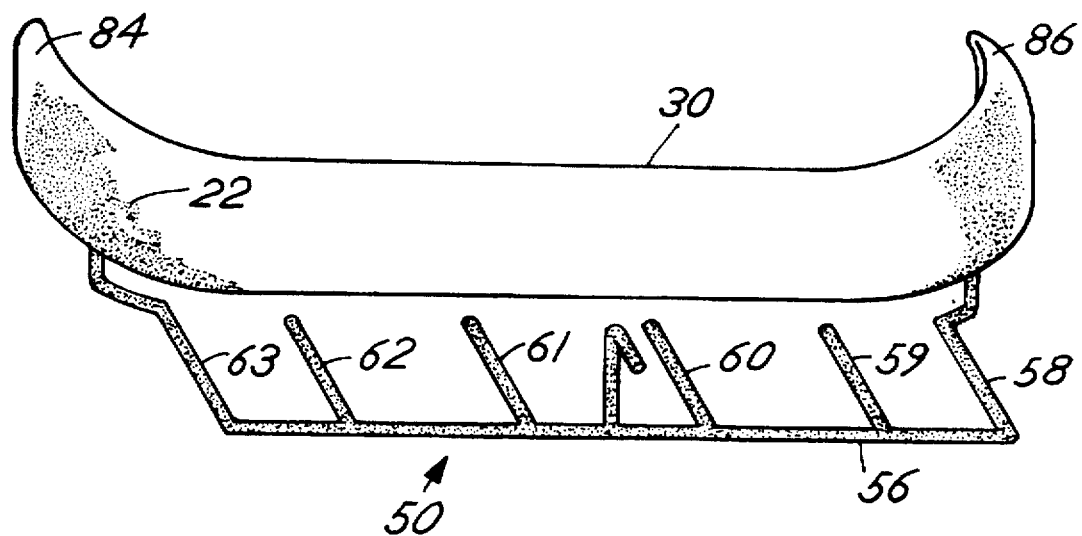
FIGS. 7(a)–(e) illustrate five temporally-spaced schematic illustrations of a mold cavity to show the melt front advancement during a 10-second fill time in an example automobile bumper mold application of the present invention through sequential operation of six valve gates.
Figure 7B:
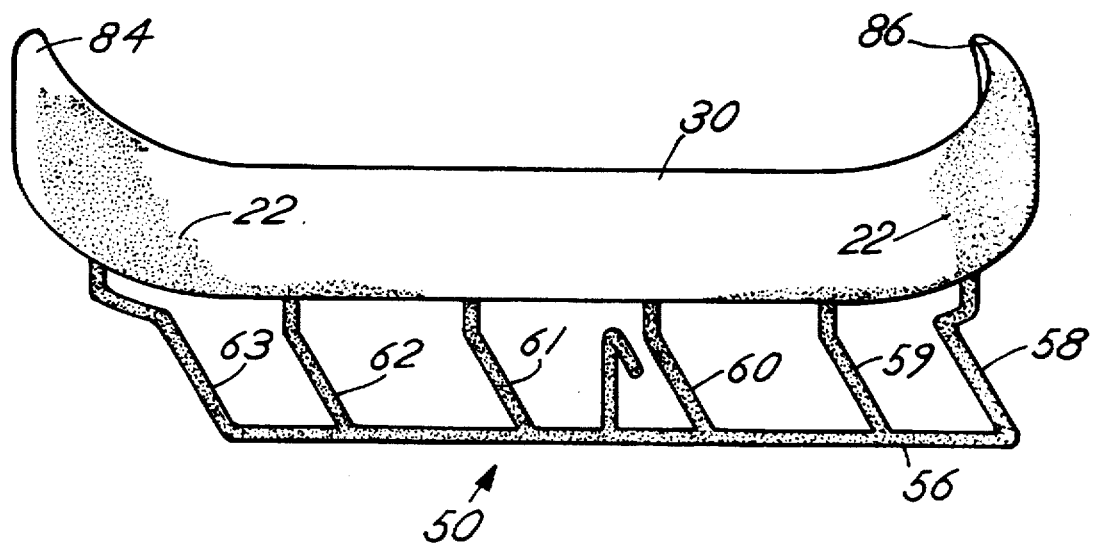
Figure 7C:
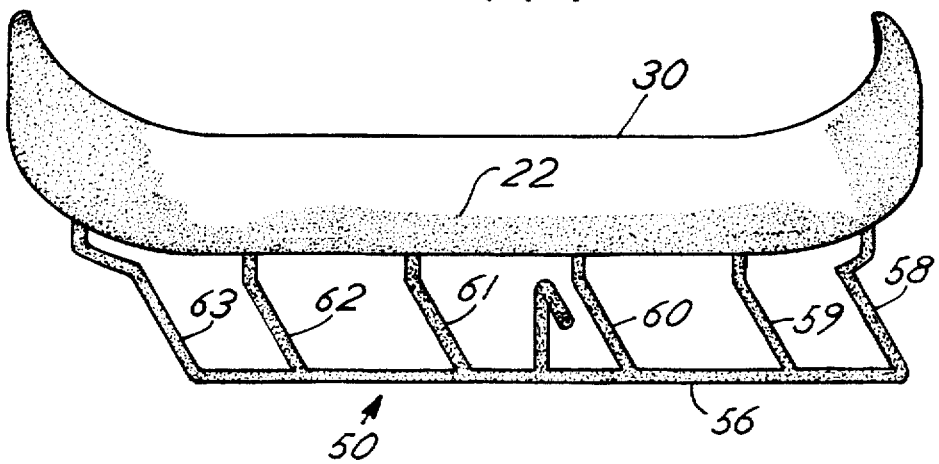
Figure 7D:
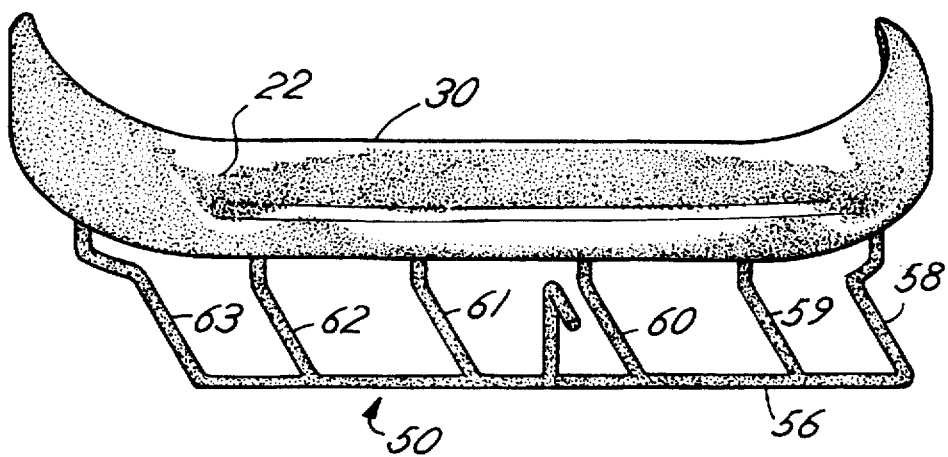
Figure 7E:
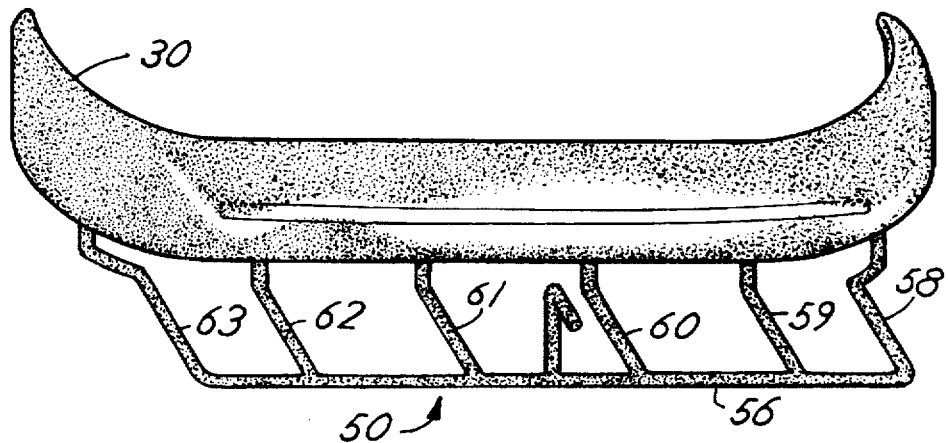

FIG. 6 is a second diagram to illustrate a reduced cycle time achieved through the preferred embodiment of the present invention in one example application. With reference to FIGS. 1, 6, 7(a)–(e), and 8, the mold cavity 30 described herein is a single-cavity automobile facia mold that is used to produce an automobile facia, such as a bumper component for example, formed from a PC/polyester material such as molded-in color PC/Polyester blend, TPO, TPE, and TPU.

With reference now to FIG. 1, plastic pellets 10 are fed from a hopper 12 into a cylindrical channel 14, where the pellets 10 are transported along the length of the channel 14 through the use of a reciprocating screw 16. The pellets 10 melt as they traverse the heated channel 14 and coalesce to form a melt pool 22. The melt pool 22 that resides upstream from the screw 16 constitutes the shot of plasticized material in que to be next injected through the mold manifold 50 and into the mold cavity 30. Displacement of the reciprocating screw 16 is detected by a positional sensor 52, and the output 53 of the sensor 52 is supplied to a control system 54 for use as later described.

The mold clamp pressure builds to and maintains a full pressure. The mold cavity 30 fills in a sequential manner, as described below, with the melt pool 22 in que. The primary or first stage injection pressure exerted on the melt pool 22 by the screw 16 creates an injection pressure that causes the melt pool 22 to advance through the main bore 56 of the manifold 50. The primary injection pressure is preferably on the order of 10,000 to 20,000 p.s.i., depending upon the viscosity of the selected material.

The six spaced drops 58–63 that depend from the main bore 56 are outfitted with valve gates 64 that may be independently open and closed through operation of a control system 54, such that the introduction of the melt 22 into the mold cavity 30 through a particular drop may be controlled independent of the other drops. Specifically, the mold is preferably outfitted with a KONA Valve Gate Hot Runner System. Six manifold drops 58–63 provide for the introduction of the melt 22 into the single mold cavity 30 at six different locations. A Kona SR20VG valve gate 64 is located at each of the six manifold drops 58–63.

Each valve gate 64 is actuated by a hydraulic control unit 66. A controller 68, such as the machine controller for the mold press for example, is programmed to provide through lines 70 the desired sequencing and other control over the pin actuation at the individual valve gate locations 64. The preferred controller 68 controls the various valve gates as a function of both cycle time and position of the screw 16. The output of a positional sensor 52 on the screw 16 may be used by the controller 68 as a reference for determining the instantaneous aft and fore position of the screw 16. The controller 68 thereby may direct the valve gates 64 to operate in such a way so as to exhibit greater control over the molding process. In this way the controller 68 may, for example, systematically control the flow fronts of the melt 22 within the mold cavity 30, and may manipulate the valve gates 64 to apply a final packing pressure at the appropriate stage of the mold cycle to compensate for shrinkage of the plasticized material away from the mold wall as the material cools.

As is shown for example in FIGS. 4(a) and 4(b), each of the six valve gates 64 feature an adjustable valve pin 74 that may be independently controlled by an appropriately-programmed control system 54. The valve pin 74 extends centrally along the length of the manifold drop, and can be reciprocated in an axial direction. When the valve pin 74 is retracted within the central channel 76 of the manifold drop, as is shown for example in FIG. 4(a), the melt 22 may pass from the main bore 56 down the central channel 76 of the drop around the valve pin 74, and out an aperture 78 at the end of the drop and into the mold cavity 30. When the valve pin 74 is moved by the control system 54 into position to plug and seal the drop aperture 78, as is shown for example in FIG. 4(b), the melt 22 ceases to flow into the mold cavity 30.

Figure 8:
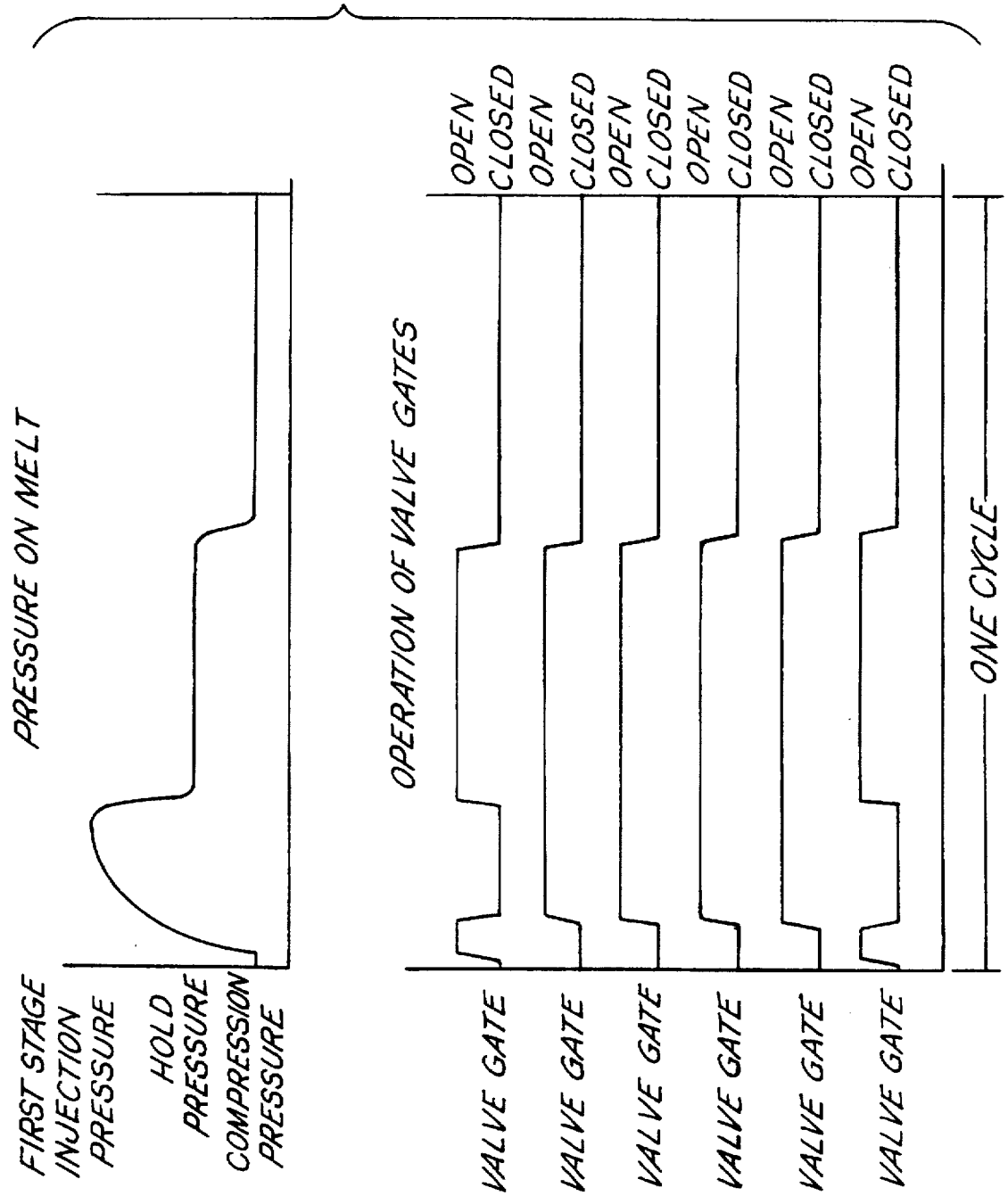
FIG. 8 is a timing diagram to illustrate the relationship between the pressure applied to the melt and the operation of the valve gates in an example embodiment of the present invention.

This positive mechanical gate shut off capability provided by the valve pin 74 not only helps reduce or eliminate vestige on part surfaces, but is also allows the valve gates 64 of the various drops 58–63 to be sequenced during the injection stage as provided by the present invention. The example mold cavity 30 illustrated in the figures fills sequentially through the six valve gated nozzles on the six manifold drops 58–63, as is shown in FIG. 8. The drops 58–63 are spaced so as to distribute plasticized material across the mold cavity 30 to completely fill the cavity 30 in an efficient manner. The control system 54 operates the valve gates 64 in a predetermined sequential manner to obtain an efficient and balanced fill of the mold cavity 30.

The valve gating sequence used for the automobile facia described herein is shown for example in FIGS. 7(a)–(e) and 8. Specifically, two gated nozzles 64 located in the outer wing regions 84 and 86 of the mold cavity 30 (drops 58 and 63) are first to open at injection time=0 seconds. The central four gated drops 59–62 remain closed and a primary or first stage injection pressure delivers plasticized material into the wing portions of the mold cavity 30 through the outer two gated drops 58 and 63. At approximately 3.5 seconds into the injection period, the outer two gated drops 58 and 63 are closed and the central four gated drops 59–62 are opened. The primary or first stage injection pressure then delivers plasticized material to the central portion of the mold cavity 30.

The particular sequencing of the six gates 64 in the preferred embodiment described herein was determined empirically. Alternatively, conventional mold fill analyses may be used to determine the appropriate sequencing of the gated nozzles to achieve the desired melt front advancement and fill balancing. It will be readily apparent that the gate sequencing that may be used in a particular application will depend on a variety of factors, including mold cavity shape, number of drops, and type of material used, to name only a few.

Once the part has been substantially filled (e.g. 95% filled) during the first stage pressure of the preferred embodiment, the outer two valve gates (64 of drops 58 and 63) open once again such that plasticized material is delivered to the mold cavity 30 through all six valve gates. The injection pressure is also lowered to a secondary or hold pressure of approximately 50% the primary injection pressure, whereby the mold may continue to fill to capacity and to compensate for shrinkage during cooling, without creating unwanted flash. The hold pressure, however, is still sufficient to avoid appreciable expansion of the melt 22. Once the mold has been completely filled, all six valve gates 64 are closed to seal the manifold from the mold cavity 30.

Because the manifold seal created by the valve pins 74 is much stronger than a seal created by a thermal gate 42 as described above, the positive mechanical gate shut off capability provided by the valve pin arrangement eliminates the need to decompress the melt 22 before, during, or after plastication. Indeed, the positive shut off provided by the valve pin arrangement avoids drool at the nozzle locations 64 without decompression of the melt 22. Therefore, a sufficient compression pressure may be maintained on the melt pool 22 whenever the valve gates 64 are closed, such as during and between part cycles for example, to avoid appreciable expansion of the melt 22. As mentioned above, expanding gasses or other volatiles in the melt 22 upstream of the valve gates 64 during melt decompression has been found to often result in imperfections in subsequently-molded parts. The compression pressure is therefore preferably of a sufficient magnitude to keep such expansion from occurring and thereby forming imperfections, such as splay for example, on the molded part. A compression pressure of at least approximately 75–150 p.s.i., for example, is preferably used in the system described herein.

Moreover, the positive mechanical gate shut off feature allows the clamp to be opened for part removal while additional material is plasticized as a part of screw recovery, thereby further reducing overall cycle time. The compression pressure is preferably maintained on the melt 22 during such screw recovery.

The total time for the sequential valve gate molding cycle described above is approximately 75 seconds or less, as compared to the 100–110 second or more cycle previously experienced with non-sequential thermal gates. Not only does the reduced cycle time result in a savings in time and energy, as well as an increase in manufacturing capacity, the reduction in cycle time also further enhances the quality of the final molded product. Indeed, decreased residence time of the melt 22 helps to avoid the occurrence of gas bubbles or other volatiles that may cause splay or other imperfections in the final product.

In addition to the reduction in overall cycle time and the occurrence of splay imperfections in the molded product, the preferred sequential fill valve gated system provides control over the melt front advancement during the filling phase. In turn, this provides more control over the final part size and shape by evenly distributing and reducing molded-in stresses. With reference to the formation of an automobile bumper for example, traditionally the center of the bumper mold fills first and becomes overpacked as the wings of the bumper mold fill out. The sequential fill valve gated system described herein permits the wings of the mold to be filled first, so as to avoid overpacking the mold center. This allows a fill pattern to be constructed whereby all the flow fronts within the mold converge simultaneously. As a result, more uniform packing may be achieved over the entire molded product to provide a lower and more uniform stress distribution within the molded product.

Moreover, since the various flow fronts can be controlled to converge more uniformly, knit line appearance can be reduced or eliminated to improve the appearance of the molded product. Knit lines in earlier molded automobile facias, for example, often occurred in the center of the part, and were sometimes visible even after painting.

Empirical analysis of the sequential fill valve gated system described herein determined that the imposition of a delay of approximately three-seconds before injecting into the mold cavity 30 through the center four gates (64 at drops 59–62) both moved and optimized the location of the knit line on the molded product, and reduced the intensity of the knit line such that any read-through after painting could be minimized and often eliminated.

Control of the flow front as described herein may also be used to reduce the occurrence of flash, which results in less trimming of the molded part and prevention of mold damage at the parting line 80. Moreover, instead of customizing the sizes of the various drop channels in the manifold to control the flow front and to balance the fill, the systematic control of the valve gates 64 as provided by the system described herein may be used to provide the necessary flow front control and fill balancing using uniformly-sized interior channels in the manifold 50. Indeed, the interior channels in all six drops 58–63 used in the system described herein are, for example, each one inch in diameter to correspond with a one-inch channel diameter upstream of the drops 58–63 in the manifold 50. There is no longer a need to design and/or otherwise rely upon customized drops, which are often both costly and time-consuming to ready. Flow front control and fill balancing is instead achieved through appropriate sequencing of the various valve gates 64, as provided by the present invention.

Control over the melt front advancement during the filling phase as provided by the present invention also makes it possible to readily increase the number of nozzles or drops used to fill the mold cavity 30. Additional nozzles may be used in this fashion to reduce the flow length versus wall thickness ratios otherwise required to fill the mold cavity 30, which can in turn lead to thinner wall molding. Such control over the filling pattern of the automobile facia described herein, for example, may result in a reduction of a typical 3.3 mm wall section by as much as 20% or more. Control over the melt front also provides for more efficient venting of the mold cavity 30, insofar as air trapped in the cavity 30 can be directed toward and out of the appropriate mold vents in a systematic manner.

The sequential fill valve gated system described herein also serves to reduce the molded-in and localized stresses. Reduced stresses of this sort result in improved dimensional stability of the molded part. Indeed, the balanced fill can reduce molded-in and localized surface stresses by equally distributing the pressure needed to fill certain regions of the mold, such as the wing regions 84 and 86 of the example bumper component mold 30 shown in the figures. This avoids any need to mold a crown onto the molded part to otherwise compensate for stress and shrinkage effects, or part movement during paint curing or elevated temperatures.

The system of the present invention also serves to improve the paint adhesion characteristics of the molded product, which can be critical in certain molding applications such as automobile facias for example. It is often required that the painted surface be capable of resisting chipping and peeling throughout the life of the molded part. Molded products formed through the use of the system described herein have evidenced improved paint adhesion characteristics, thereby reducing the time and expense necessary to ensure that paint otherwise adheres to the part.

The improved paint adhesion characteristics is attributed to the lower surface stresses on the molded product, and to the more controlled and efficient mold cavity venting capable of being realized with the present invention. Under certain typical processing conditions, the surface structure of the base resin can be altered in such a way that paint adhesion is negatively effected. Specifically, the molded surface, under the influence of high pressures, high temperatures, and entrapped volatiles resulting from an unbalanced fill, becomes more chemically resistant to solvents required for paint preparation. The increased control over the fill pattern as provided by the sequential fill valve gated system described herein reduces molded-in stresses which, in turn, results in improved paint adhesion characteristics of the molded product.

With the ability to control fill patterns and knit line locations, it is also possible to successfully fill more complex mold cavity geometries. This increased molding window gives the design engineer more flexibility with molded parts such as automobile facias for example. Further, as industries such as the automotive industry move toward molded-in color for large exterior and interior applications, the control provided by the sequential fill valve gated system described herein over fill patterns and knit line locations— which are important for molded-in color applications— offers the added processability to meet this challenge. The elimination or reduction of knit lines in molded-in parts, for example, can be achieved by sequencing the valve pins 74 such that the outboard nozzle opens first and, the next inboard gate opens after the flow front from the outboard nozzle passes the inboard gate location. Material from the inboard nozzle pushes through the flow front and advances to the next adjacent inboard nozzle location. This process continues until the flow front passes the last nozzle location at which the last gate opens to finish filling the mold cavity 30. The result can be the elimination or at least a reduction of knit lines, which can prove to be significant in the success of a molded-in color application.

Although certain embodiments of the invention have been described and illustrated herein, it will be readily apparent to those of ordinary skill in the art that a number of modifications and substitutions can be made to the sequential fill valve gated injection molding system disclosed and described herein without departing from the true spirit and scope of the invention.

We claim:

1. A method for molding large components, comprising the steps of:

providing a single cavity mold;

providing a manifold for communicating plasticized material to said single cavity mold, said manifold having at least two spaced valve gates that are independently opened and closed as directed by a controller to selectively communicate plasticized material from said manifold to said mold cavity at separate locations in the mold;

applying a primary injection pressure to said plasticized material in said manifold to fill said mold cavity through sequential opening and closing of said valve gates as directed by said controller;

applying a secondary injection pressure to said plasticized material in said manifold to continue to fill said mold cavity and to prevent appreciable expansion of said material, said secondary injection pressure being less than said primary injection pressure;

closing said valve gates to seal said manifold from said mold cavity when said mold cavity is filled; and holding said plasticized material within said manifold in compression to prevent appreciable expansion of said material while said mold cavity is open for removal of said molded component from said mold cavity, said compression being maintained with the assistance of said closed valve gates.

2. A method for molding large components as set forth in claim 1, further comprising the step of:

plasticizing additional material while said mold cavity is open for removal of said molded component from said mold cavity, said additional plasticized material being held for anticipated communication through said manifold into said mold cavity during a subsequent molding cycle, and said additional plasticized material being held in compression with the assistance of said closed valve gates to prevent appreciable expansion of said material.

3. A method for molding large components as set forth in claim 1, wherein said controller directs all of said valve gates to open for simultaneous transfer of plasticized material through said valve gates into said mold cavity while said secondary injection pressure is applied to said plasticized material in said manifold.

4. A method for molding large components as set forth in claim 3, wherein said secondary injection pressure is applied with the aid of a screw from an injection molding machine, and wherein occurrence of said direction from said controller to all of said valve gates to open for simultaneous transfer of plasticized material through said valve gates is a function of both molding cycle time and position of said screw.

5. A method for molding large components as set forth in claim 4 wherein said primary injection pressure is in the range of about 10,000 to about 20,000 p.s.i.

6. A method for molding large components as set forth in claim 1 wherein said primary injection pressure is in the range of about 10,000 to about 20,000 p.s.i.

7. A method for molding large components as set forth in claim 5 wherein said secondary injection pressure is about 50% of said primary injection pressure.

8. A method for molding large components as set forth in claim 1 wherein said secondary injection pressure is about 50% of said primary injection pressure.

9. A method for molding large components as set forth in claim 7 wherein said compression is at a pressure of about 75–150 p.s.i.

10. A method for molding large components as set forth in claim 1 wherein said compression is at a pressure of about 75–150 p.s.i.

* * * * *